United States Patent [19]

Reeser et al.

[11] Patent Number: 4,915,052

[45] Date of Patent: Apr. 10, 1990

[54] METHOD FOR RESTORING AND MAINTAINING BUOYANCY AND APPARATUS FOR PREVENTING LOSS OF BUOYANCY FOR FLOATPLANES

[76] Inventors: Gregory C. Reeser; Terry Wolgamot, both of 1600 Kapiolani Blvd., Suite 616, Honolulu, Hi. 96814

[21] Appl. No.: 278,615

[22] Filed: Nov. 30, 1988

[51] Int. Cl.⁴ .............................................. B63B 43/12
[52] U.S. Cl. .................................. 114/267; 244/100 A
[58] Field of Search ................... 114/68, 69, 54, 292, 114/266, 267, 227–229, 355–357, 59; 244/100 A, 105

[56] References Cited

U.S. PATENT DOCUMENTS

| | | | |
|---|---|---|---|
| 2,966,131 | 12/1960 | Elijah | 114/54 |
| 3,019,754 | 2/1962 | Welshausen | 114/68 |
| 3,304,900 | 2/1967 | Greenwood | 114/292 |
| 4,802,435 | 2/1989 | Choi | 114/69 |

Primary Examiner—Sherman D. Basinger
Assistant Examiner—Edwin L. Swinehart
Attorney, Agent, or Firm—Martin E. Hsia

[57] ABSTRACT

A method for restoring and maintaining buoyancy for floatplane floats by inserting an inflatable air bag into the leaking compartment in the float and inflating the air bag until the water in the float is expelled from the float and the air bag seals the leak. A puncture resistant air bag also may be permanently installed in a floatplane float at the time of manufacture in order to prevent leaks.

3 Claims, 2 Drawing Sheets

METHOD FOR RESTORING AND MAINTAINING BUOYANCY AND APPARATUS FOR PREVENTING LOSS OF BUOYANCY FOR FLOATPLANES

BACKGROUND OF THE INVENTION

This invention relates to a method for restoring and maintaining buoyancy and an apparatus for preventing loss of buoyancy for a floatplane.

Floatplanes are airplanes with floats attached for landing and taking off on water. The floats must have sufficiency buoyancy to allow the entire airplane to float on water and therefore must be watertight. Floatplanes are often used in remote areas where landing areas are unavailable because a floatplane only requires a clear stretch of water to land. Some floats on floatplanes are also equipped with wheels to allow the floatplane to taxi out of the water after landing and this invention applies equally well to such wheeled floats. Floats on floatplanes usually are made of sections of aluminum (or other light and rigid material) riveted together.

Because floatplanes are often used in remote locations, they are often far away from repair facilities. Thus, if the float on a floatplane develops a leak, it is very difficult, if not impossible, to repair the leak. The loss of buoyancy caused by a leak in a floatplane float will usually make it impossible to taxi and take off. Thus, there is a need for a method of restoring and maintaining the buoyancy of floatplane floats that can be used in a remote area.

Various patents have been issued for methods and apparatus for raising sunken vessels. For example, U.S. Pat. No. 643,766 issued to Grant described an apparatus for raising sunken vessels that employed air bags and pontoons. However, an inventor seeking to solve the problem of restoring and maintaining buoyancy for a floatplane would not look to apparatus for raising sunken vessels because a leak on a floatplane will not cause the float to sink, although it will reduce the buoyancy sufficiently to prevent the plane from taking off. In fact, floatplanes were not even invented at the time of the patent to Grant, so that the problem solved by this invention was not even in existence at the time the patent was issued to Grant.

It is therefore an object of this invention to provide a method for restoring and maintaining the buoyancy of floatplane floats. It is a further object of this invention to provide such a method that can be practiced with equipment that is lightweight and compact to allow storage on the floatplane itself so that it will be available during emergencies. It is a further object of this invention to provide an apparatus that will prevent the loss of buoyancy in the first place.

SUMMARY OF THE INVENTION

These and other objects are achieved by inserting an inflatable air bag into the leaking float, and then inflating the bag until the water is displaced from the leaking float and the leak is sealed. In order to prevent the float from leaking in the first place, the inflatable air bag could be inserted into the float during manufacturing and the bag could be permanently inflated to provide a barrier against incoming water in the event of a leak.

In the practice of the method of this invention for restoring and maintaining buoyancy, it is preferred that the air bag be a spherical bag of 16 gauge poly-butyl rubber having a diameter of approximately 30 inches and having a 12 inch long flexible rubber valve stem. It is preferred that the bag be inflated to approximately 30 pounds per square inch. If there are sharp protrusions inside the float due to a collision with an underwater object or for some other reason, a blanket or other sheet of material may be placed inside the float prior to inserting the air bag in order to protect the air bag against puncturing.

In the embodiment of this invention for preventing loss of buoyancy with a permanently inflated air bag, it is preferred that the air bag be shaped to conform to the interior shape and dimensions of each compartment (usually a "duffel bag" shape), constructed of highly puncture resistant synthetic rubber and having a shorter valve stem. The preferred pressure would still be approximately 30 pounds per square inch. Preferably the float also would have a valve stem opening for access to the valve stem to maintain air pressure in the air bag.

BRIEF DESCRIPTION OF THE DRAWINGS

The various objects, benefits and advantages of the present invention will become apparent upon reading the following description of the invention in conjunction with the attached drawings, in which.

DETAILED DESCRIPTION OF A PREFERRED EMBODIMENT

Figure 1:
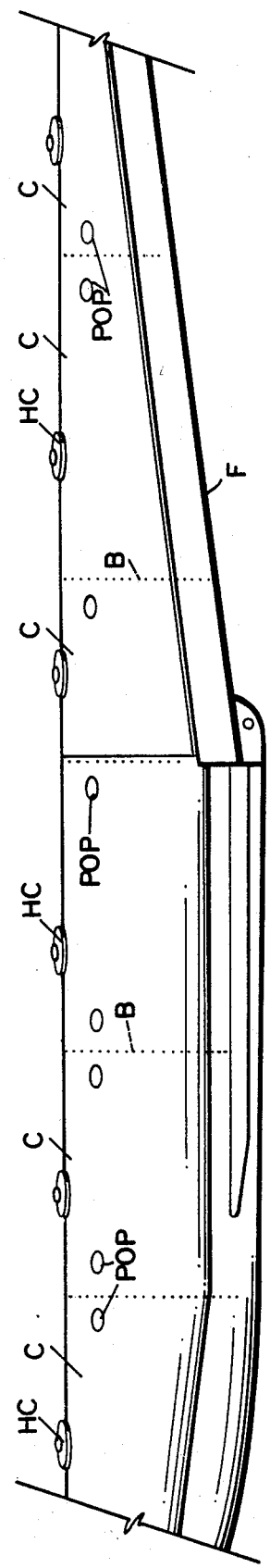
FIG. 1 is an illustration of a typical float of a floatplane;
2.

Referring to FIG. 1, a typical float has several compartments C. Each of these compartments C has a hatch cover HC and at least 1 pump-out port POP. There is a bulkhead B between each of the compartments C to prevent leakage of water from one compartment to another.

Figure 2:
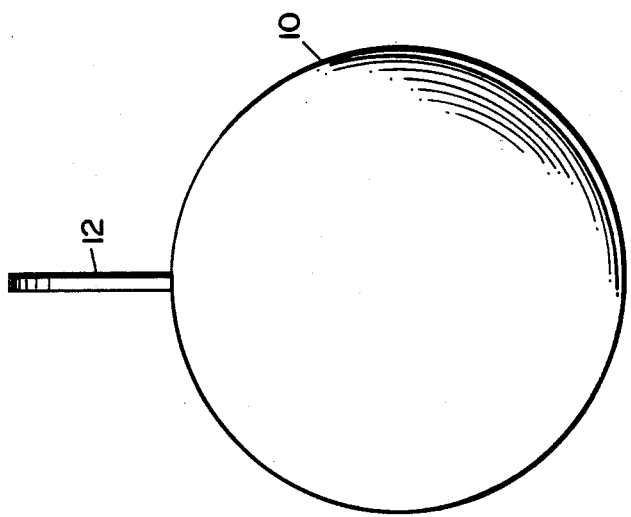
FIG. 2 is an illustration of an air bag for use in practice of this invention;
3.

Referring to FIG. 2, an air bag to be used in the practice of this invention comprises a 16-gauge polybutyl ball 10 having a 12 inch long flexible rubber valve stem 12 for inflating the ball 10.

Figure 3:
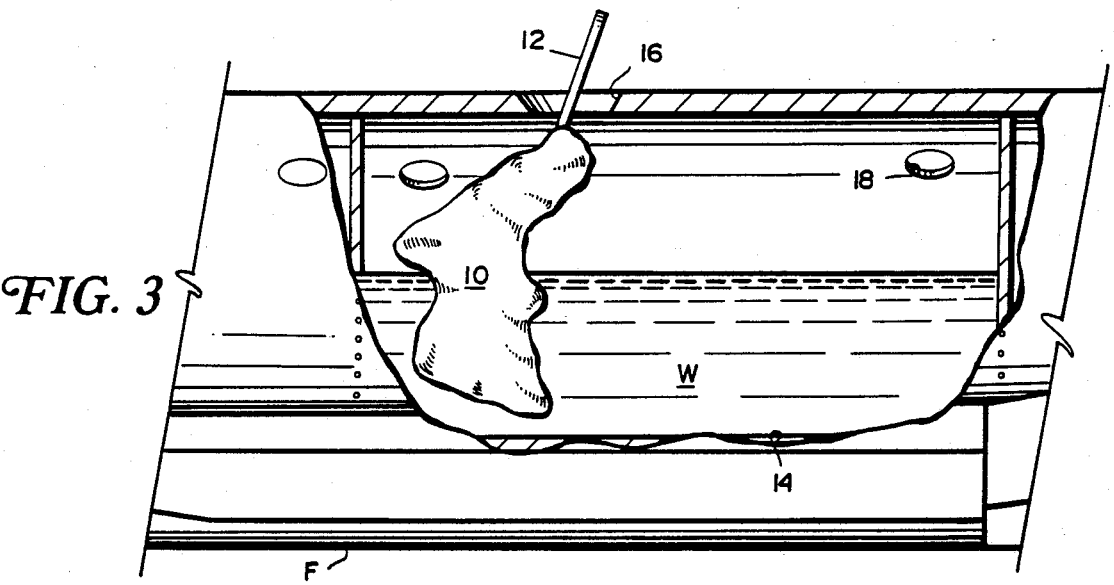
FIG. 3 is a cutaway view of a compartment in the float of FIG. 1 showing the deflated air bag being inserted into a flooded compartment;
4.

Referring to FIG. 3, shown is a compartment 14 in the float F that leaks. The leak may be from a lost rivet or structural damage to the float itself. Because there is a leak in the compartment 14, water W has entered into the compartment 14 and has reduced the buoyancy of the float F.

In the practice of this invention, the hatch cover (not shown) of the leaking compartment 14 has been removed and the air bag 10 has been inserted into the leaking compartment 14, with the valve stem 12 projecting through the hatch 16. The pump-out ports 18 of the flooded compartment 14 also must be opened.

Figure 4:
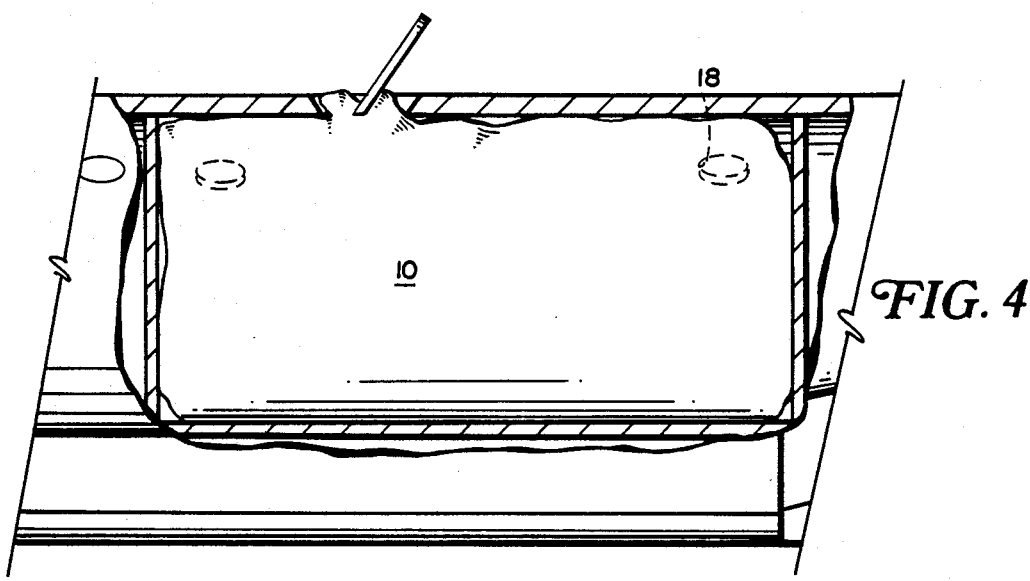
FIG. 4 is a cut-away view of the compartment of FIG. 3 after the air bag has been fully inflated; and
5.

After the deflated air bag has been inserted into the flooded compartment 14 as shown in FIG. 3, a compressor (preferably a 250 pound per square inch battery-powered air compressor that can be powered by the floatplane's cigarette lighter or external power source) is used to inflate the bag 10 until it fills the compartment 14, as shown in FIG. 4. As the air bag 10 is inflated, the water W is expelled from the compartment 14 through the pump-out port 18. When the bag 10 becomes fully inflated, it conforms to the interior configuration of the compartment 14 and exerts outward pressure against the compartment 14, thereby sealing the leak in the compartment 14. The preferred pressure is 30 pounds per square inch.

If the hatch 16 is too large to contain the inflated bag 10, then a few short braces may be placed inside the hatch to prevent the bag from ballooning outside the hatch.

Poly-butyl rubber is preferred in the practice of this invention because of its abilities to expand and conform to the interior of the flooded compartment 14 and therefore to displace the water and to seal the leaks. However, any material that has the same or comparable abilities to expand and conform to the interior of the flooded compartment is also suitable for practice of this invention.

Figure 5:
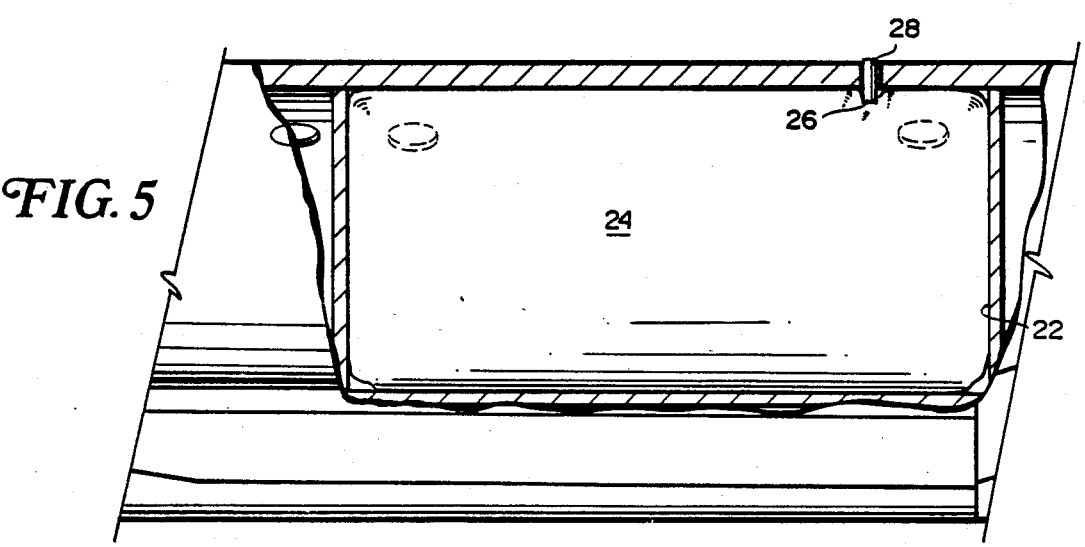
FIG. 5 is a cut-away view of a compartment in a float in which a permanent air bag has been installed.

Referring to FIG. 5, shown is a compartment 22 with a permanently installed and inflated air bag 24 filling the compartment 22. The air bag 24 has a valve stem 26 projecting through a valve stem aperture 28 in the compartment 28. The air bag is preferably made of puncture resistant synthetic rubber and is preferably inflated to 30 pounds per square inch.

This invention has been described above in connection with a particular preferred embodiment and modifications and changes from the disclosed process and apparatus may be made without departing from the spirit and scope of the invention. Accordingly, no limitations are to be inferred or implied except as set forth in the appended claims.

What is claimed is:

1. A method for restoring and maintaining buoyancy of a leaking floatplane float having multiple compartments with access hatches and pump-out ports to allow the floatplane to taxi and take-off, comprising the steps of:
   ascertaining which compartment in said float is leaking;
   inserting an inflatable air bag through an access hatch into said leaking compartment;
   opening the pump-out ports for said leaking compartment; and
   inflating said air bag until sufficient water is displaced from said leaking compartment through said pump-out ports that said float is sufficiently buoyant to allow said floatplane to taxi and take-off and until said air bag is sufficiently inflated that said leak is sufficiently sealed to maintain such buoyancy during said taxiing and take-off.

2. A method for restoring and maintaining buoyancy of a leaking floatplane float having multiple compartments with access hatches and pump-out ports to allow the floatplane to taxi and take-off, as described in claim 1, wherein said air bag comprises:
   a spherical bag comprising 16-gauge poly-butyl rubber having a diameter of approximately 30 inches and having a long flexible rubber valve stem that is approximately 12 inches long.

3. A method for restoring and maintaining buoyancy of a leaking floatplane float having multiple compartments with access hatches and pump-out ports to allow the floatplane to taxi and take-off, as described in claim 1, wherein:
   said inflating step is carried out until the pressure in said air bag is approximately 30 pounds per square inch.

* * * * *